US010853661B2

(12) United States Patent
Xu et al.

(10) Patent No.: US 10,853,661 B2
(45) Date of Patent: Dec. 1, 2020

(54) METHODS AND SYSTEMS FOR OPTIMIZED SELECTION OF DATA FEATURES FOR A NEURO-LINGUISTIC COGNITIVE ARTIFICIAL INTELLIGENCE SYSTEM

(71) Applicant: Intellective Ai, Inc., Dallas, TX (US)

(72) Inventors: Gang Xu, Katy, TX (US); Tao Yang, Katy, TX (US); Ming-Jung Seow, Richmond, TX (US)

(73) Assignee: Intellective Ai, Inc., Dallas, TX (US)

( * ) Notice: Subject to any disclaimer, the term of this patent is extended or adjusted under 35 U.S.C. 154(b) by 0 days.

(21) Appl. No.: 16/120,943

(22) Filed: Sep. 4, 2018

(65) Prior Publication Data

US 2019/0172449 A1    Jun. 6, 2019

Related U.S. Application Data

(63) Continuation-in-part of application No. 15/481,298, filed on Apr. 6, 2017, now abandoned, which is a continuation-in-part of application No. PCT/US2017/026419, filed on Apr. 6, 2017.

(60) Provisional application No. 62/319,170, filed on Apr. 6, 2016, provisional application No. 62/318,999, filed on Apr. 6, 2016.

(51) Int. Cl.
*G06K 9/00* (2006.01)
*G10L 15/16* (2006.01)
*G10L 15/197* (2013.01)
*G06N 20/00* (2019.01)
*G06F 40/20* (2020.01)

(52) U.S. Cl.
CPC ......... *G06K 9/00771* (2013.01); *G06F 40/20* (2020.01); *G06K 9/00335* (2013.01); *G06K 9/00624* (2013.01); *G06N 20/00* (2019.01); *G10L 15/16* (2013.01); *G10L 15/197* (2013.01)

(58) Field of Classification Search
CPC ... G06F 17/2735; G06F 17/2785; G06N 3/04; G06N 3/08; G06K 9/0035; G06K 9/00624; G06K 9/00771
USPC .............................................. 704/9; 382/103
See application file for complete search history.

(56) References Cited

U.S. PATENT DOCUMENTS

| | | | |
|---|---|---|---|
| 7,864,980 | B2 | 1/2011 | Evans |
| 8,411,935 | B2 | 4/2013 | Eaton et al. |
| 9,501,915 | B1 | 11/2016 | Laska et al. |
| 9,710,727 | B2 | 7/2017 | Bala et al. |
| 2003/0113017 | A1 | 6/2003 | Thomas et al. |
| 2005/0240629 | A1 | 10/2005 | Gu et al. |
| 2011/0043536 | A1 | 2/2011 | Cobb et al. |
| 2014/0279764 | A1 | 9/2014 | Lahr |

(Continued)

OTHER PUBLICATIONS

Office Action for U.S. Appl. No. 15/481,298, dated Mar. 2, 2018, 14 pages.

(Continued)

*Primary Examiner* — Shaun Roberts

(57) ABSTRACT

Techniques are disclosed to optimize feature selection in generating betas for a feature dictionary of a neuro-linguistic Cognitive AI System. A machine learning engine receives a sample vector of input data to be analyzed by the neuro-linguistic Cognitive AI System. The neuro-linguistic Cognitive AI System is configured to generate multiple betas for each of a plurality of sensors. The machine learning engine identifies a sensor specified in the sample vector and selects optimization parameters for generating betas based on the identified sensor.

18 Claims, 2 Drawing Sheets

(56) References Cited

U.S. PATENT DOCUMENTS

| | | |
|---|---|---|
| 2015/0100943 A1 | 4/2015 | Gabel et al. |
| 2015/0379430 A1 | 12/2015 | Dirac et al. |
| 2016/0078361 A1 | 3/2016 | Brueckner et al. |
| 2016/0364963 A1 | 12/2016 | Matsuoka et al. |
| 2017/0083764 A1 | 3/2017 | Risinger et al. |
| 2017/0293606 A1 | 10/2017 | Xu et al. |

OTHER PUBLICATIONS

International Search Report and Written Opinion for International Application No. PCT/US2017/026419, dated Jul. 10, 2017, 8 pages.

METHODS AND SYSTEMS FOR OPTIMIZED SELECTION OF DATA FEATURES FOR A NEURO-LINGUISTIC COGNITIVE ARTIFICIAL INTELLIGENCE SYSTEM

CROSS-REFERENCE TO RELATED APPLICATIONS

This application is a continuation-in-part of U.S. application Ser. No. 15/481,298, filed Apr. 6, 2017, which in turn claims priority to and benefit of U.S. Application Nos. 62/319,170 and 62/318,999, each filed on Apr. 6, 2016; this application is also a continuation-in-part of PCT Application No. PCT/US2017/026419, filed Apr. 6, 2017, which in turn claims priority to and benefit of U.S. Application Nos. 62/319,170, and 62/318,999, each filed on Apr. 6, 2016; the entirety of each of the aforementioned applications are herein expressly incorporated by reference for all purposes.

TECHNICAL FIELD

Embodiments of the present disclosure generally relate to data analysis systems. More specifically, some embodiments presented herein provide techniques to optimize feature selection in lexical feature word generation when building feature dictionaries of feature word collections based on input data to be used in a neuro-linguistic cognitive Artificial Intelligence system.

BACKGROUND

Many currently available surveillance and monitoring systems are trained to observe specific activities and alert an administrator after detecting those activities, and such rules-based monitoring systems typically require advance knowledge of what actions and/or objects to observe.

SUMMARY

Currently available surveillance and monitoring systems (e.g., video surveillance systems, SCADA systems, and the like) are trained to observe specific activities and alert an administrator after detecting those activities. However, such rules-based monitoring systems typically require advance knowledge of what actions and/or objects to observe. The activities may be hard-coded into underlying applications, or the system may train itself based on any provided definitions or rules. More specifically, unless the underlying code includes descriptions of certain rules, activities, behaviors, or cognitive responses for generating a special event notification for a given observation, the typical known monitoring system is incapable of recognizing such behaviors. A rules-only-based approach is too rigid. That is, unless a given behavior conforms to a predefined rule, an occurrence of the behavior can go undetected by the monitoring system. Even if the monitoring system trains itself to identify the behavior, the monitoring system requires rules to be defined in advance for what to identify.

One embodiment of the present disclosure relates to a computer-implemented method to optimize feature selection to generate an adaptive linguistic model. The method includes receiving a sample vector of input data from a sensor. The sample vector of input data can indicate a type of the sensor. The method additionally includes, via a processor, identifying the sensor based on the sample vector of input data, generating a plurality of feature symbols by organizing the sample vector of input data into probabilistic clusters, determining optimization parameters based on the sensor identified, generating a plurality of feature words based at least in part on at least one of combinations of the plurality of feature symbols or combinations of optimization parameters, and generating the adaptive linguistic model based at least in part on combinations of the plurality of feature words.

In some instances, the sample vector of input data is a first sample vector of input data. The method further includes, receiving a second sample vector of input data from the sensor, generating a plurality of feature words for the second sample vector of input data via the processor, and updating the adaptive linguistic model based at least in part on the plurality of feature words generated for the second sample vector of input data. In some instances, determining the optimization parameters further includes tuning a plurality of parameters based on the type of the sensor. The adaptive linguistic model can be generated at least in part on the plurality of parameters. The tuning is based on at least one of a maximum length of each feature word in the plurality of feature words, a maturity threshold for each feature word in the plurality of feature words, a statistical significance of each feature word in the plurality of feature words, or a feature dictionary. The feature dictionary is generated from the plurality of feature words.

In some instances, the sensor is at least one of an image sensor, a video sensor, an audio sensor, or a SCADA sensor. The optimization parameters can differ based on the type of the sensor. In some instances, generating the adaptive linguistic model includes determining a tunable strategy to generate the plurality of feature words based on the type of the sensor.

Other embodiments include, without limitation, a non-transitory computer-readable medium that includes instructions that enable a processing unit to implement one or more aspects of the disclosed methods as well as a system having a processor, memory, and application programs configured to implement one or more aspects of the disclosed methods.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein. It should also be appreciated that terminology explicitly employed herein that also may appear in any disclosure incorporated by reference should be accorded a meaning most consistent with the particular concepts disclosed herein.

Other systems, processes, and features will become apparent upon examination of the following drawings and detailed description. It is intended that all such additional systems, processes, and features be included within this description, be within the scope of the disclosed subject matter, and be protected by the accompanying claims.

BRIEF DESCRIPTION OF THE DRAWINGS

The drawings primarily are for illustrative purposes and are not intended to limit the scope of the subject matter described herein. The drawings are not necessarily to scale: in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
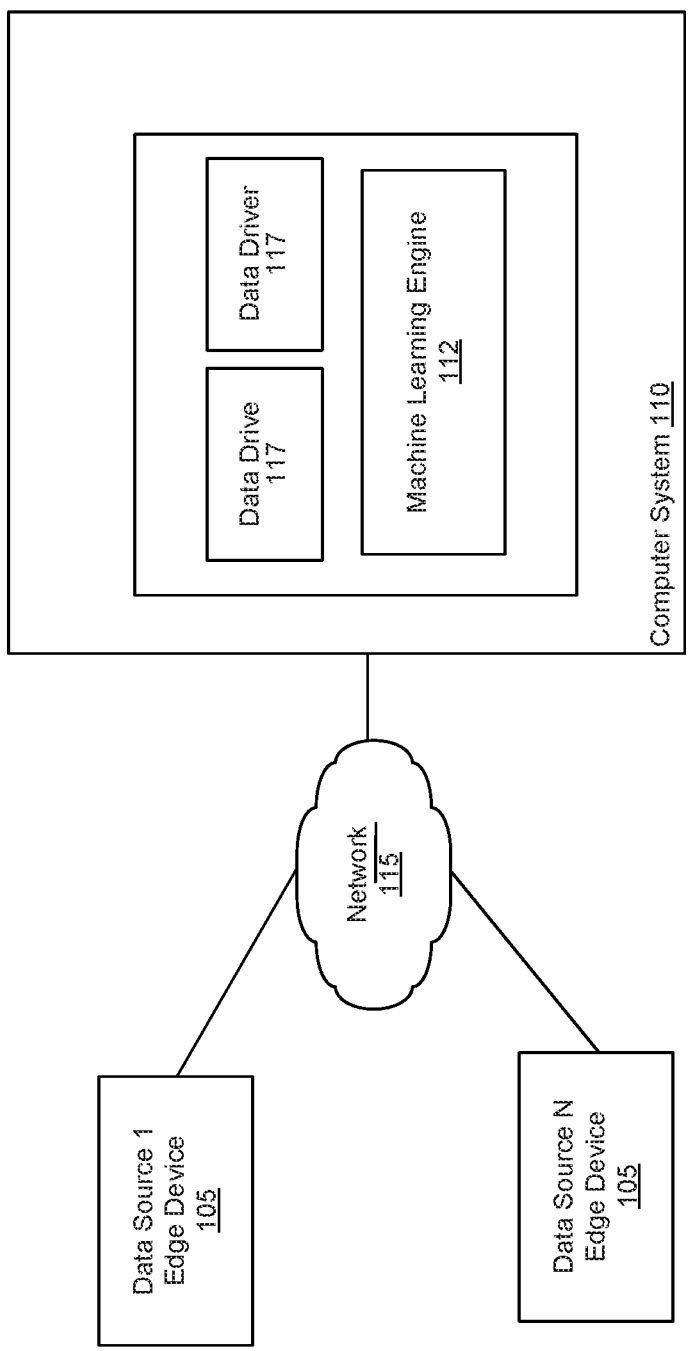
FIG. 1 illustrates an example computing environment, according to one embodiment.

Embodiments presented herein describe optimizing feature selection in generating feature words (betas) for neuro-linguistic analysis of input data streams. The cognitive Artificial Intelligence (AI) system may be configured with one or more data collector components that collect raw data values from different data sources (e.g., video data, building management data, SCADA data). For example, a cognitive AI system may be configured for video surveillance. The cognitive AI system may include a data collector component that retrieves video frames in real-time, separates foreground objects from background objects, and tracks foreground objects from frame-to-frame. The data collector component may normalize objects identified in the video frame data into numerical values (e.g., falling within a range from 0 to 1 with respect to a given data type) and send samples corresponding to objects found in the video frame data to the neuro-linguistic module.

In one embodiment, the cognitive AI system includes a neuro-linguistic module that performs neural network-based linguistic analysis on the collected data. Specifically, for each type of data monitored by a sensor, the neuro-linguistic module creates and refines a linguistic model of the normalized data. That is, the neuro-linguistic module builds a feature syntax used to describe the normalized data. The linguistic model includes symbols that serve as building blocks for the feature syntax. Core symbols associated with base features in the data are called alphas. Collections of one or more alphas are called betas or feature words. Collections of betas are called gammas or feature syntax. The neuro-linguistic module identifies feature words (betas) to build a feature dictionary. Once the feature dictionary is built, the neuro-linguistic module identifies gammas that include various combinations of betas in the feature dictionary. The cognitive AI system uses such a linguistic model to describe what is being observed. The linguistic model allows the cognitive AI system to distinguish between normal and abnormal activity observed in the input data. As a result, the cognitive AI system can issue special event notifications whenever an abnormal activity occurs.

To generate the linguistic model, the neuro-linguistic module receives normalized data values and organizes the data into probabilistic clusters. The neuro-linguistic module evaluates statistics of each cluster and identifies statistically relevant probabilistic clusters. Further, the neuro-linguistic module generates base symbols, e.g., alphas, corresponding to each statistically relevant probabilistic cluster. Thus, input values mapping to a given probabilistic cluster may correspond to a feature symbol.

The neuro-linguistic module generates a lexicon, i.e., builds a feature dictionary, of observed combinations of feature symbols, (i.e., feature words/betas) based on a statistical distribution of feature symbols identified in the input data. That is, the neuro-linguistic model generates feature words based on statistical distribution of feature symbols. A feature word is a collection of feature symbols. Said another way, a beta is a collection of alphas. Specifically, the neuro-linguistic module may identify patterns of feature symbols associated with the input data at different frequencies of occurrence. Further, the neuro-linguistic module can identify statistically relevant combinations of feature symbols at varying lengths (e.g., from one-symbol to collections of multiple symbol feature word length). The neuro-linguistic module may include such statistically relevant combinations of feature symbols in a feature-words (beta) dictionary used to identify the generative model of feature words (feature-combination rule set) for the linguistic model. The feature-combination rule set is generated based on statistically relevant combinations of feature symbols.

Using feature words (betas) generated by applying the feature dictionary (also referred to as "feature-combination rule set"), the neuro-linguistic module generates gammas based on probabilistic relationships of each feature word/beta occurring in sequence relative to other feature words as additional data is observed. For example, the neuro-linguistic module may identify a relationship between a given three-alpha beta pattern that frequently appears in sequence with a given four-alpha beta pattern, and so on. The neuro-linguistic module determines a feature syntax based on the identified betas.

The feature syntax allows the cognitive AI system to learn, identify, and recognize patterns of behavior without the aid or guidance of predefined activities. Unlike a rules-based surveillance system, which contains predefined patterns of what to identify or observe, the cognitive AI system learns patterns by generalizing input and building behavior memories of what is observed. Over time, the cognitive AI system uses these memories to distinguish between normal and anomalous behavior reflected in observed data.

For instance, the neuro-linguistic module builds alphas, betas (nouns, adjectives, verbs, etc.), gammas, and estimates an "unusualness score" for each identified alpha, beta, and gamma.

The unusualness score (for an alpha, beta, or gamma observed in input data) indicates how infrequently the alpha, beta, or gamma has occurred relative to past observations. Thus, the cognitive AI system may use the unusualness scores to both identify and measure how unusual a current syntax is relative to—a semantic memory of feature symbols (also referred to as "alphas"), a semantic memory of feature words (also referred to as "betas") built from the symbols (i.e., a feature dictionary), and a semantic memory of feature syntax (also referred to as "gammas") built from the betas—collectively the neuro-linguistic model.

In one embodiment, a machine learning engine such as the cognitive AI system may work with a variety of sensors, such as SCADA sensors, video sensors, audio sensors, etc. Consequently, when generating betas for a given sensor, some approaches may be more advantageous than those used in other sensors. For example, in SCADA, data values to be evaluated are generally more primitive (e.g., temperature, pressure values), and thus fewer feature symbols are required to describe those values in betas. That is, fewer alphas are required to generate betas. For instance, for data values associated with SCADA, betas may be described by a two alpha pattern or a three alpha pattern. In contrast, in information security, more symbols may be required to describe a network address. However, a generic approach in the neuro-linguistic module may be to identify shorter collections by default. Such an approach would be effective for a SCADA sensor, but inefficient for an information security sensor.

In one embodiment, the neuro-linguistic module may be configured to receive a sample vector of input data from one or more sensors. The neuro-linguistic model evaluates sample vectors for sensor information. That is, the neuro-linguistic model identifies the sensor that a given sample vector corresponds to. The sample vector is a vector of input data stream such that each component of the vector corresponds to a specific feature value measured by one or more sensors. For example, for a sample vector including 32 components, each component corresponds to a particular attribute such as temperature, pressure, flow, etc. Based on the sensor information, the neuro-linguistic module selects optimization parameters tuned to that sensor for feature modeling and beta generation. That is, the parameters and the strategies for modeling the neuro-linguistic model may be tuned based on the sensor information. Some non-limiting examples of optimization parameters include beta generation strategies (e.g., statistical significance of beta), maturity thresholding, and maximal beta length for samples corresponding to that sensor. The neuro-linguistic module may apply different strategies for samples having different corresponding sensors. Once selected, the neuro-linguistic applies those parameters to the incoming sample vector. Advantageously, embodiments provide a flexible approach for adjusting beta generation and modeling strategies, in turn allowing for optimal performance of the neuro-linguistic module and thus, the Cognitive AI System.

FIG. 1 illustrates an example computing environment, according to one embodiment. As shown, the computing environment includes one or more data sources 105 and a computing system 110, each interconnected via a network 115 (e.g., the Internet). The computing system 110 further includes one or more data drivers 117 and a machine learning engine 112.

In some instances, the data drivers 117 obtain data from the data sources 105. Each of the data drivers 117 may handle different data, such as SCADA data, information security data, video data, audio data, etc. That is, one or more sensors (not shown) corresponding to a data source 105 may measure and/or detect raw signals from the data sources 105 to forward to the corresponding data driver 117. The data driver 117 may be a software program (stored in or executed by hardware) including sensor-modules to process data from the sensors and forward the processed metadata to the machine learning engine 112. The one or more sensors may be devices configured to measure and/or detect raw signals from data sources 105. For example, a data driver 117 including a video sensor module may retrieve information from a sensor that measures and/or detects raw signals from a data source 105 such as camera. The data driver 117 may then process the data and forward the processed metadata to the machine learning engine 112 for further analysis. In some instances, the sensor module may be a composite type module that can handle data from different types of sensor data. That is, a data driver 117 including a composite type module may retrieve data from different sensors and/or devices such as video sensors (e.g., camera), SCADA, audio sensors, and/or the like. The data driver 117 may then process this data from the different sensors/devices and finally forward metadata representing the heterogeneous data to the machine learning engine 112. Each data driver 117 generates a sample vector that includes feature values and a sensor type. The data driver 117 may then forward the sample vector to the machine learning engine 112 for further analysis.

Figure 2:
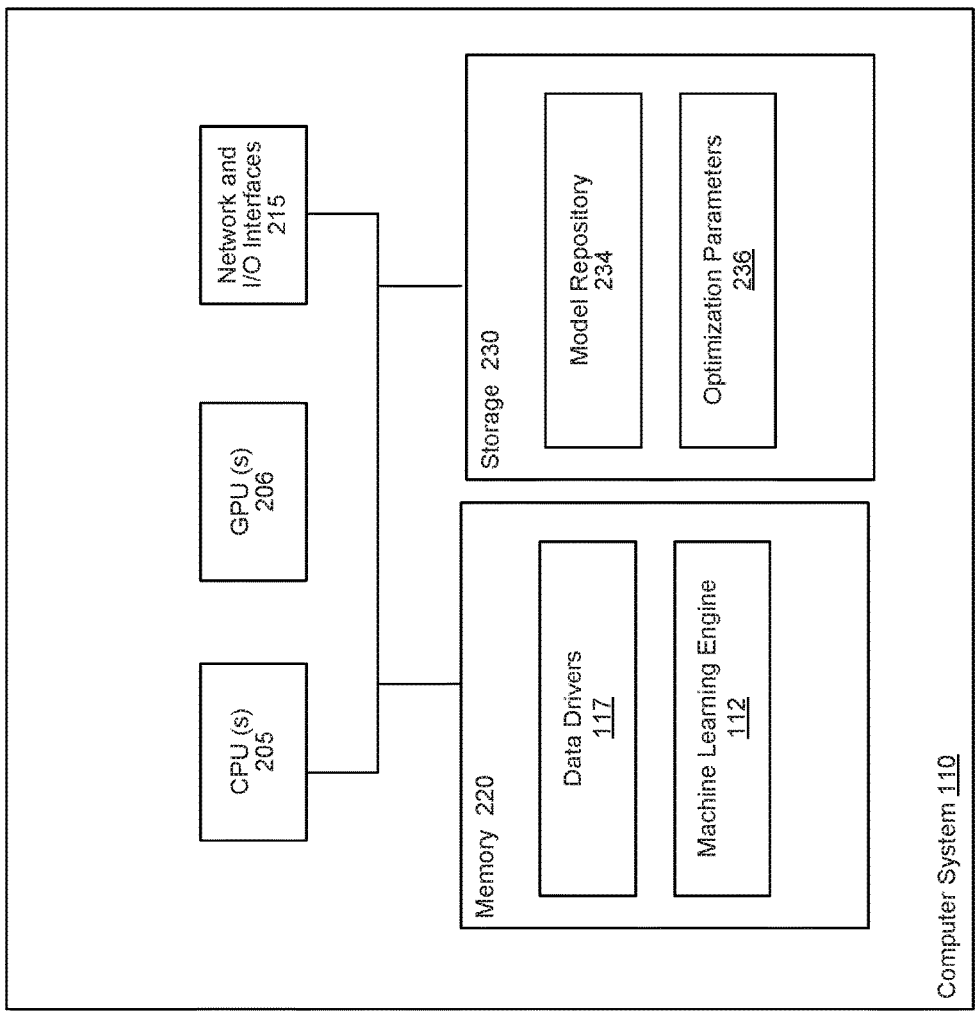
FIG. 2 illustrates an example computing system configured to optimize feature selection in generating a feature dictionary beta collections for neuro-linguistic analysis, according to one embodiment.

FIG. 2 further illustrates the computing system 110, according to one embodiment. As shown, the computing system 110 includes one or more CPUs 205, one or more GPUs 206, network and I/O interfaces 215, a memory 220, and a storage 230. The CPU 205 retrieves and executes programming instructions stored in the memory 220 as well as stores and retrieves application data residing in the storage 230. In one embodiment, the GPU 206 implements a Compute Unified Device Architecture (CUDA). Further, the GPU 206 is configured to provide general purpose processing using the parallel throughput architecture of the GPU 206 to more efficiently retrieve and execute programming instructions stored in the memory 220 and also to store and retrieve application data residing in the storage 230. The parallel throughput architecture provides thousands of cores for processing the application and input data. As a result, the GPU 206 leverages the thousands of cores to perform read and write operations in a massively parallel fashion. Taking advantage of the parallel computing elements of the GPU 206 allows the computing system 110 to better process large amounts of incoming data (e.g., input from a video and/or audio source). As a result, the computing system 110 may scale with relatively less difficulty.

The data drivers 117 provides one or more data collector components. Each of the collector components is associated with a particular input data source, e.g., a video source, a SCADA (supervisory control and data acquisition) source, an audio source, etc. The collector components retrieve (or receive, depending on the sensor) input data from each source at specified intervals (e.g., once a minute, once every thirty minutes, once every thirty seconds, etc.). The data drivers 117 control the communications between the data sources. Further, the data drivers 117 normalize input data and send the normalized data to a sensory memory residing in the memory 220. The normalized data may be packaged as a sample vector, which includes information such as feature values, sensor type, sensor id, and a sample id.

The sensory memory is a data store that transfers large volumes of data from the data drivers 117 to the machine learning engine 112. The sensory memory stores the data as records. Each record may include an identifier, a timestamp, and a data payload. Further, the sensory memory aggregates incoming data in a time-sorted fashion. Storing incoming data from each of the data collector components in a single location where the data may be aggregated allows the machine learning engine 112 to process the data efficiently. Further, the computing system 110 may reference data stored in the sensory memory in generating special event notifications for anomalous activity. In one embodiment, the sensory memory may be implemented via a virtual memory file system in the memory 220.

The machine learning engine 112 receives data output from data drivers 117. Generally, components of the machine learning engine 112 generate a linguistic representation of the normalized vectors. As described further below, to do so, the machine learning engine 112 clusters normalized values having similar features and assigns a distinct feature symbol/alpha to each probabilistic cluster, The machine learning engine 140 may then identify recurring combinations of feature symbols in the data to generate betas. The machine learning engine 112 then similarly identifies recurring combinations of betas in the data to generate feature syntax/gammas.

In particular, the machine learning engine provides a lexical analyzer that builds a feature dictionary that includes combinations of co-occurring feature symbols/alphas. The feature dictionary may be built from the feature symbols transmitted by a symbolic analysis component (SBAC) that identifies the feature symbols using clustering techniques. The lexical analyzer identifies repeating co-occurrences of feature symbols/alphas output from the symbolic analysis component and calculates frequencies of the co-occurrences throughout the feature symbol stream. The combinations of feature symbols may semantically represent a particular activity, event, etc.

In some instances, the lexical analyzer limits the length of feature words/betas in the feature dictionary to allow the lexical analyzer to identify a number of possible combinations without adversely affecting the performance of the computing system 110. Further, the lexical analyzer may use level-based learning models to analyze symbol combinations and learn betas. The lexical analyzer learns betas up through a maximum symbol combination length at incremental levels, i.e., where one-alpha betas are learned at a first level, two-alpha betas are learned at a second level (i.e., betas generated by a combination of two alphas), and so on. In practice, limiting a beta to a maximum of five or six symbols (i.e., learning at a maximum of five or six levels) has shown to be effective.

The lexical analyzer is adaptive. That is, the lexical analyzer component 219 may learn and generate betas in the feature dictionary over time. The lexical analyzer may also reinforce or decay the statistical significance of betas in the feature dictionary as the lexical analyzer receives subsequent streams of feature symbols over time. Further, the lexical analyzer may determine an unusualness score for each beta based on how frequently the beta recurs in the data. The unusualness score may increase or decrease over time as the neuro-linguistic module processes additional data.

In addition, as additional observations (i.e., feature symbols/alphas) are passed to the lexical analyzer and identified as a given feature word/beta, the lexical analyzer may determine that the beta model has matured. Once a beta model has matured, the lexical analyzer may output observations of those feature words/betas in the model to a Syntax Analysis Component (SXAC) module in the machine learning engine 112 that generates feature syntax/gammas. In one embodiment, the lexical analyzer limits betas sent to the SXAC to the most statistically significant betas. In practice, for each single sample, outputting occurrences of the top thirty-two most statistically relevant betas has shown to be effective (while the most frequently occurring betas stored in the models can amount to thousands of betas). Note, over time, the most frequently observed betas may change as the observations of incoming alphas change in frequency (or as new alphas emerge by the clustering of input data by the symbolic analysis component. Thus, the linguistic model that is generated is adaptive.

Further, in one embodiment, the lexical analyzer may apply various optimization parameters for a given input sample vector of data, based on the sensor type associated with the sample, e.g., whether the sample corresponds to SCADA data, information security data, video data, and the like. The lexical analyzer evaluates the sample for the sample type and selects a set of optimization parameters based on the type. Thus, the optimization parameters are tunable. Because optimal tunable parameters of a given sensor may differ from parameters of another sensor, a generic set of optimization strategies may be inefficient for the sensor. The lexical analyzer selects the optimization parameters based on the type of sensor and performs the rules according to the selected optimization parameters, e.g., using a specified beta generation strategy that is specific to the type of sensor (e.g., based on statistical significance of beta, the model of feature symbols, etc.), applying a maximal beta length based on the sensor type, etc. In this manner, the lexical analyzer generates feature words from feature symbols based on the optimization parameters.

Once the lexical analyzer has built the feature dictionary (i.e., identifies betas that have reached a predefined statistical significance), the lexical analyzer sends occurrences of betas subsequently observed in the input stream to the SXAC. The SXAC builds a feature syntax of gammas from the betas output by the lexical analyzer component. In practice, lexical analyzer may build a useful feature dictionary of betas after receiving approximately 15,000 observations (i.e., input alphas from the symbolic analysis component).

In the preceding, reference is made to embodiments of the present disclosure. However, the present disclosure is not limited to specific described embodiments. Instead, any combination of the following features and elements, whether related to different embodiments or not, is contemplated to implement and practice the techniques presented herein.

As used herein, the terms "optimal," "optimized," "optimizing," used in specification and claims are intended to generally cover, for example, best possible solution, most favorable solution, and/or merely an improved solution. For example, in some instances it is possible that "optimizing/optimal" described herein may generate a solution that may not be the best possible solution or most favorable solution, but instead an improved solution (that may fall short of the best possible solution). In such instances, methods described herein may optionally generate the best possible solution, the most favorable solution or an improved solution, depending on one or more aspects such as one or more input data, model parameters, updated parameters, variables associated with the input data, the type of input source devices, other characteristics associated with the input source devices, and/or type of constraints involved in performing "optimization." In a similar manner, in some instances, it is possible that the best possible solution may not necessarily be an improved solution and vice versa.

Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim (s).

Aspects presented herein may be embodied as a system, method or computer program product. Accordingly, aspects of the present disclosure may take the form of an entirely hardware embodiment, an entirely software embodiment (including firmware, resident software, micro-code, etc.) implemented in hardware, or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures.

For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments presented herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present disclosure, other and further embodiments may be devised without departing from the basic scope thereof, and the scope thereof is determined by the claims that follow.

CONCLUSION

Further, it should be appreciated that a computing system (e.g., computing system 110 in FIG. 1 and FIG. 2) may be embodied in any of a number of forms, such as a rack-mounted computer, a desktop computer, a laptop computer, or a tablet computer. Additionally, a computing system may be embodied in a device not generally regarded as a computer but with suitable processing capabilities, including a Personal Digital Assistant (PDA), a smart phone or any other suitable portable or fixed electronic device.

Also, a computing system may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing system may receive input information through speech recognition or in other audible format.

Such computing systems may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Also, various disclosed concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A computer-implemented method to optimize feature selection to generate an adaptive linguistic model for a cognitive Artificial Intelligence (AI) system, the method comprising:
    receiving from a sensor, a sample vector of input data, the sample vector of input data including an indication of a sensor type associated with the sensor, the sensor type being one of an image sensor, a video sensor, an audio sensor, or a supervisory control and data acquisition (SCADA) sensor;
    generating a plurality of feature symbols by organizing the sample vector of the input data into probabilistic clusters;
    determining optimization parameters to optimize feature selection, the determining the optimization parameters based on the sensor type, the optimization parameters including at least one of a beta generation strategy parameter, a maturity thresholding parameter, or a maximal beta length;
    generating a plurality of betas based at least in part on the optimization parameters; and
    generating an adaptive linguistic model based at least in part on the plurality of betas, the adaptive linguistic model configured for a cognitive artificial intelligence system to distinguish between normal and abnormal activity in the input data.

2. The computer-implemented method of claim 1, wherein the sample vector of the input data is a first sample vector of the input data, the method further comprising:
    receiving, from the sensor, a second sample vector of the input data;
    generating, a plurality of betas for the second sample vector of the input data; and
    updating the adaptive linguistic model based at least in part on the plurality of betas generated for the second sample vector of the input data.

3. The computer-implemented method of claim 1, wherein determining the optimization parameters further comprises:
    tuning a plurality of parameters based on the sensor type, the adaptive linguistic model being generated at least in part on the plurality of parameters.

4. The computer-implemented method of claim 3, wherein the tuning is based on at least one of: a maximum length of each feature word in the plurality of betas, a maturity threshold for each feature word in the plurality of betas, a statistical significance of each feature word in the plurality of betas, and a feature-combination rule set; the feature-combination rule set being generated from the plurality of betas.

5. The computer-implemented method of claim 1, wherein the optimization parameters differ based on the sensor type.

6. The computer-implemented method of claim 1, wherein generating the adaptive linguistic model includes determining a tunable strategy to generate the plurality of betas based on the sensor type.

7. A non-transitory computer-readable storage medium storing instructions, that when executed by a computer system, perform operations to generate an adaptive linguistic model, the instructions comprising instructions to:
    identify a sensor type associated with a sensor, based on an indication of the sensor type included in a sample vector of input data received from the sensor, the sensor type being one of an image sensor, a video sensor, an audio sensor, or a SCADA sensor;
    generate a plurality of feature symbols by organizing the sample vector of the input data into probabilistic clusters;
    determine, after identifying the sensor type, optimization parameters to optimize feature selection, the determination of the optimization parameters based on the sensor type, the optimization parameters including at least one of a beta generation strategy parameter, a maturity thresholding parameter, or a maximal beta length;
    generate a plurality of betas based at least in part on the optimization parameters; and
    generate the adaptive linguistic model based at least in part on the plurality of betas, the adaptive linguistic model configured for use in a cognitive artificial intelligence system to distinguish between normal and abnormal activity in the input data.

8. The computer-readable storage medium of claim 7, wherein the sample vector of the input data is a first sample vector of the input data, the instructions further comprising instructions to:
    identify the sensor type based on a second sample vector of the input data;

generate, after identification, a plurality of betas for the second sample vector of the input data; and update the adaptive linguistic model based at least in part on the plurality of betas generated for the second sample vector of the input data.

9. The computer-readable storage medium of claim 7, wherein determining the optimization parameters further comprises instructions to:

tune a plurality of parameters based on the sensor type, the adaptive linguistic model being generated at least in part on the plurality of parameters.

10. The computer-readable storage medium of claim 9, wherein the tuning is based on at least one of a maximum length of each feature word in the plurality of betas, a maturity threshold for each feature word in the plurality of betas, a statistical significance of each feature word in the plurality of betas and a feature-combination rule set; the feature-combination rule set being generated from the plurality of betas.

11. The computer-readable storage medium of claim 7, wherein the instructions to generate the adaptive linguistic model includes instructions to determine a tunable strategy to generate the plurality of betas based on the sensor type.

12. The computer-readable storage medium of claim 7, wherein the optimization parameters differ based on the sensor type.

13. A system, comprising:

a processor;

and a memory, including an application program configured to perform operation for processing data, the operations comprising:

identifying a sensor type associated with a sensor, based on an indication of the sensor type included in a sample vector of input data received from the sensor, the sensor type being one of an image sensor, a video sensor, an audio sensor, or a SCADA sensor;

generating a plurality of feature symbols by organizing the sample vector of the input data into probabilistic clusters;

determining, after identifying the sensor type, optimization parameters to optimize feature selection, the determination of the optimization parameters based on the sensor type, the optimization parameters including at least one of a beta generation strategy parameter, a maturity thresholding parameter, or a maximal beta length;

generating a plurality of betas based at least in part on the optimization parameters;

generating the adaptive linguistic model based at least in part on the plurality of betas, the adaptive linguistic model configured for distinguishing between normal and abnormal activity in the input data.

14. The system of claim 13, wherein the sample vector of the input data is a first sample vector of the input data, the operations further comprising:

identifying the sensor type based on a second sample vector of the input data;

generating, after identifying, a plurality of betas for the second sample vector of the input data; and updating the adaptive linguistic model based at least in part on the plurality of betas generated for the second sample vector of the input data.

15. The system of claim 13, wherein determining the optimization parameters further comprises:

tuning a plurality of parameters based on the sensor type, the adaptive linguistic model being generated at least in part on the plurality of parameters.

16. The system of claim 15, wherein:

the tuning is based on a maximum length of each feature word in the plurality of betas, a maturity threshold for each feature word in the plurality of betas, a statistical significance of each feature word in the plurality of betas, or a feature-combination rule set, the feature-combination rule set being generated from the plurality of betas.

17. The system of claim 13, wherein generating the adaptive linguistic model includes determining a tunable strategy to generate the plurality of betas based on the sensor type.

18. The system of claim 13, wherein the optimization parameters differ based on the sensor type.

\* \* \* \* \*